G. SJOLANDER.
AUTO REST.
APPLICATION FILED OCT. 22, 1913.
1,105,462.
Patented July 28, 1914.
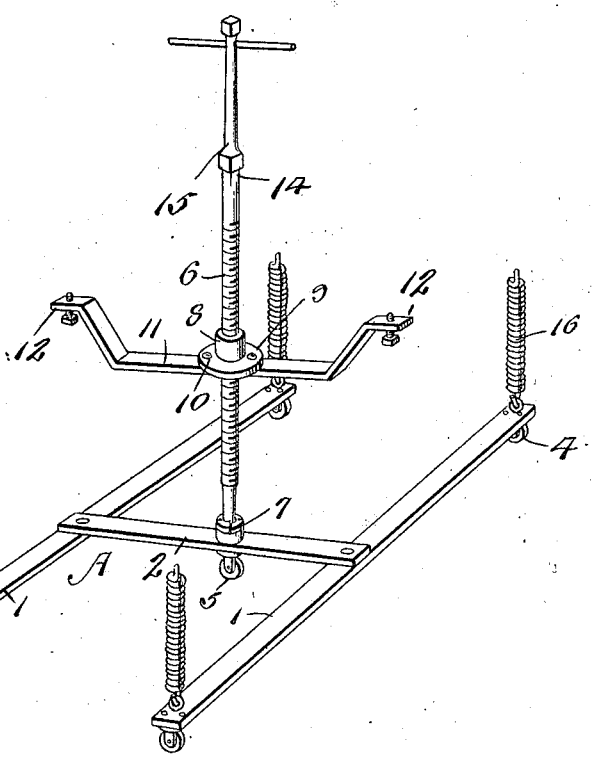
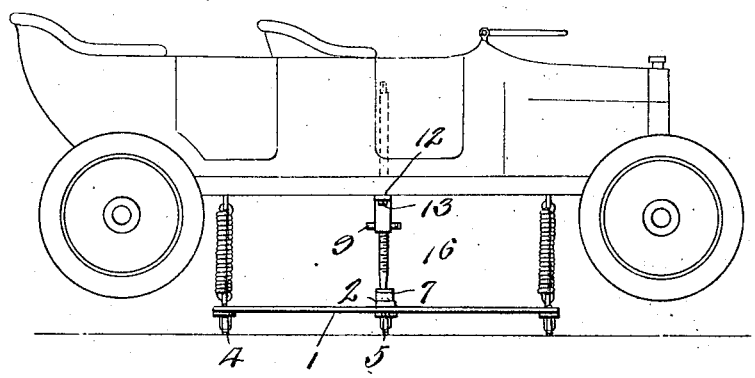
Witnesses
Inventor
G. Sjolander,
By Victor J. Evans
Attorney

UNITED STATES PATENT OFFICE.

GUSTAF SJOLANDER, OF MIDLAND, MICHIGAN.

AUTO-REST.

1,105,462.      Specification of Letters Patent.      Patented July 28, 1914.

Application filed October 22, 1913. Serial No. 796,681.

*To all whom it may concern:*

Be it known that I, GUSTAF SJOLANDER, a citizen of the United States, residing at Midland, in the county of Midland and State of Michigan, have invented new and useful Improvements in Auto-Rests, of which the following is a specification.

This invention relates to auto rests, the object of the invention being to provide a device in the nature of an attachment to an automobile, the said device remaining attached to the machine and being continually carried thereby and adapted, whenever necessary, to elevate the automobile so that the wheels will be out of contact with the floor, ground or other surface on which the automobile has previously been resting.

A further object of the invention is to provide a device of the character referred to which is capable of being operated by the driver without leaving his seat in the machine.

The invention also has for its object to provide a construction of jack or rest, the parts of which may be drawn upwardly so as not to interfere with the operation of the machine and to provide the necessary road clearance.

With the above and other objects in view, the invention consists in the construction, combination and arrangement of parts, as will hereinafter be more fully described, illustrated and claimed.

In the accompanying drawings:—Figure 1 is a perspective view of an automobile rest embodying the present invention and shown detached from the machine. Fig. 2 is a side elevation of an automobile showing the appliance of this invention mounted thereon.

The automobile rest contemplated in this invention comprises essentially a bottom truck designated generally by the reference character A and embodying a pair of spaced parallel frame bars 1 and a centrally arranged connecting cross bar 2 rigidly fastened at its opposite ends to the bars 1 at or near the center of the latter. The bars 1 are provided at their opposite extremities with supporting casters 4 while another caster 5 is placed on the under side of the reach bar 2 just to one side of the center of the latter.

6 designates a jack screw the lower extremity of which is connected by a ball and socket joint 7 to the reach bar 2, sufficiently to one side of the center of the latter to enable said jack screw to avoid the drive shaft of the automobile, which drive shaft is usually located in the exact longitudinal center of the machine.

8 designates a nut through which the jack screw 6 is threaded, said nut being provided with an enlarged flange 9 to which is fastened by means of bolts 10 or their equivalent an inverted arched brace 11 the two oppositely extending arms 12 of which are bolted or otherwise firmly secured as shown at 13 to the frame of the automobile.

The jack screw 6 extends upwardly through the floor of the automobile body and in the preferred embodiment of the invention is provided with a squared upper extremity 14 adapting it to receive and be operated by a socket wrench 15.

16 designates coiled springs terminally connected to the truck and the frame of the automobile, said springs serving to balance the automobile after the wheels thereof have been elevated clear of the ground. These springs do not interfere with the raising of the truck A when the machine is not in use, said truck being raised to a point close up to the bottom of the automobile body so as not to interfere with the operation of the machine on the road.

From the foregoing description it will be seen that the device hereinabove described is in the nature of a combination jack, truck and lock, or in other words, the device operates to elevate the machine out of contact with the ground, it also enables the machine while supported thereby to be rolled from place to place, and it also prevents the machine from being operated by an unauthorized person as the wheels are sustained out of operative contact with the floor or ground. The device will also be found beneficial in saving wear and tear on tires as it is an easy matter requiring only a few turns of the socket wrench to take the weight of the machine off the tires when the car is to be left standing for some time. The automobile may be shifted around a garage, store room or other place without lowering it, on account of the truck being provided with supporting casters. In view of the fact that the device as a whole is carried continually by the car, it is unnecessary to carry the usual jack in the tool box or under the seat. In case the machine should become mired, the wheels of the machine may be lifted clear of the ground by means of the device hereinabove described sufficiently to place boards or the like under the wheels, thus enabling the machine to extricate itself under its own power.

The device of this invention is attached to the body of the vehicle so as to bring the jack screw 6 as near as possible to the center of gravity of the vehicle, thereby reducing as far as possible any uneven stress on the balancing springs and enabling the machine to be supported with all of its wheels clear of the ground or floor.

What I claim is:—

1. The combination with a motor driven vehicle, of a truck located beneath and carried by the body of the vehicle, a jack screw for raising and lowering said truck, said jack screw being operable from above the floor of the vehicle, and yieldable body balancing connections between said truck and vehicle body.

2. The combination with a motor driven vehicle, of a truck located beneath the body of the vehicle, caster wheels adapted to support said truck, a jack screw for raising and lowering said truck, said jack screw being operable from above the floor of the vehicle, a nut through which said jack screw is threaded, a brace connecting said nut rigidly with the frame of the machine, and springs interposed between said truck and the frame of the vehicle.

3. The combination with a motor driven vehicle, of a truck mounted below the body of the vehicle, a jack screw for raising and lowering said truck, said jack screw having a ball and socket connection with the truck and being operable from above the floor of the vehicle, a nut through which said jack screw is threaded, a brace rigidly supporting said nut and connected to the frame of the machine, and balancing connections between said truck and the frame of the vehicle.

In testimony whereof I affix my signature in presence of two witnesses.

GUSTAF SJOLANDER.

Witnesses:
F. L. Post,
Mona V. Atkinson.